Figure 1:
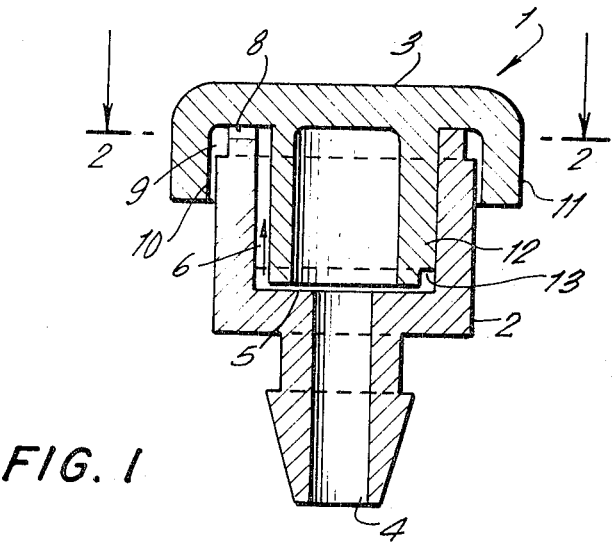

United States Patent

[11] 3,540,483

| [72] | Inventor | Isaac Ronni Rinkewich, <br> New York, New York |
|---|---|---|
| [21] | Appl. No. | 735,468 |
| [22] | Filed | June 7, 1968 |
| [45] | Patented | Nov. 17, 1970 |
| [73] | Assignee | Rinko Irrigation Systems <br> New York, New York <br> a corporation of Delaware |

[54] IRRIGATION VALVE FOR DRIP SYSTEM
3 Claims, 2 Drawing Figs.

[52] U.S. Cl. ............................................. 138/42,
222/421
[51] Int. Cl. ....................................... B05b 1/00
[50] Field of Search .......................... 138/40, 42,
44; 137/199; 220/44A; 222/421, 422

[56] References Cited
UNITED STATES PATENTS

| 1,482,534 | 2/1924 | Woodbridge.................. | 220/44-A |
| 1,919,408 | 7/1933 | Work ............................ | 138/40 |
| 2,025,905 | 12/1935 | Safford........................ | 138/40 |
| 2,037,145 | 4/1936 | Palermo ....................... | 138/42 |

*Primary Examiner*—Laverne D. Geiger
*Assistant Examiner*—Richard J. Sher
*Attorney*—Blum, Moscovitz, Friedman & Kaplan ABSTRACT: An irrigation valve comprising a base and cap of generally cylindrical form and having a bore along the axis of the cylinder, one end of said bore constituting an inlet and the other end constituting an outlet, the cap on said outlet end, and provided with a depending outer flange at its periphery, a depending inner flange fitting within said bore, at least one passage for flow of liquid between said inner flange and the wall of said bore, a channel from the upper end of each said passage to an exit, said exit being between said outer flange and said cylinder, an opening between said passage and said inlet having a smaller cross section than the exit.

Patented Nov. 17, 1970

3,540,483

INVENTOR.
ISAAC RONNI RINKEWICH
BY
Breiman & Breiman
ATTORNEYS 3,540,483

IRRIGATION VALVE FOR DRIP SYSTEM

The present invention relates to a valve for irrigation systems, more specifically, a drip valve whereby water constantly flows out at a comparatively slow rate.

Such valves are of great value in irrigation systems since they have no moving parts, and provide a steady flow of water. There is little wastage due to evaporation because the water tends to be absorbed by the soil, and due to its slow rate of flow there is comparatively little water at the surface of the soil at any given time.

In practising the invention, there is provided a base of generally cylindrical form having a bore axially thereof. The bore extends through the base, and one end is an inlet and the other is an outlet.

A cap is provided which rests on the outlet end, and has a depending outer flange at the periphery thereof. This flange is so dimensioned as to result in a comparatively small clearance between its inner wall and the outer wall of the base. The gap is of the order of four one-thousandths of an inch.

Preferably, the cap is provided with a depending inner flange which fits within the bore. In the most desirable embodiment of the invention, the flange fits within the bore with virtually no clearance between its outer diameter and the inner wall of the bore. However, at least one point on the periphery a recess exists, forming a channel through which the water may flow. At the lower end of the flange is a shoulder formed by the narrowing of the bore. The inlet end of the bore is preferably of smaller diameter than the outlet. The lower end of the inner flange approaches closely the shoulder but leaves a clearance of the order of two one-thousandths or three one-thousandths of an inch.

In register with the upper end of the passage is a channel which permits the water to flow from the passage to the space between the outer flange and the cylinder, constituting an exit for the fluid.

It has been found advantageous to recess the upper end of the outer wall of the base providing an enlarged annular chamber which permits the liquid to flow all around the periphery of the valve and drip out substantially uniformly at all points.

It has been found that a valve such as described herein will operate very satisfactorily under pressures of the order of 10 pounds per square inch, and will permit even delivery of approximately 2 gallons per hour.

Figure 2:
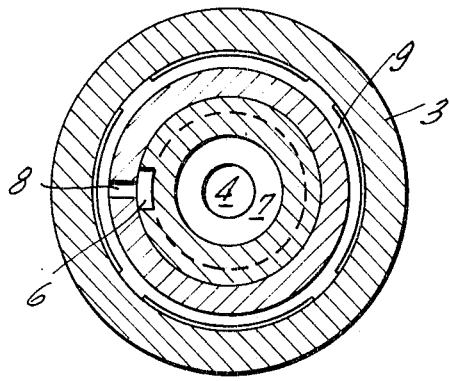

In the accompanying drawings constituting a part hereof, and in which like reference characters indicate like parts, FIG. 1 is a vertical cross section of the valve taken along the central axis of the bore; and FIG. 2 is a cross section along line 2–2 of FIG. 1.

The valve 1 is composed of base 2 and cap 3. Base 2 contains inlet 4 axially thereof, which widens out into chamber 7 at the outlet end.

Cap 3 is provided with depending outer flange 11 and depending inner flange 12. Flange 12 fits within chamber 7 and has passage 6 cut therein. The outlet end of chamber 7 has at least one channel 8 cut therein, so that liquid may flow from passage 6 to recess 9. From recess 9, the liquid drips out of exit 10 which is formed between flange 11 and the outer wall of base 2.

For most suitable functioning of this valve, space 5 of passage 6 of small cross section is formed. This portion preferably should be of smaller cross section than exit 10.

By this means it is insured that no particles contained in the water can clog the valve. If a particle is small enough to pass through space 5, it must of necessity be small enough to pass through annulus 13, passage 6, channel 8, recess 9, and, most importantly, exit 10.

Although the depth of space 5 is quite small, the fact that liquid will flow radially from inlet 4 into annulus 13 permits a greater flow than is desired for the valve. The limiting factor is the cross section of channel 8 which while higher than space 5, is nonetheless of smaller total area. Merely by controlling the size of channel 8, the rate of flow can easily and accurately be determined.

The comparatively small cross section of exit 10 prevents the entry of sand or other solids from the outside which are liable to clog the valve. By suitably selecting the cross sections of opening 5 and exit 10, a valve can easily be constructed which can be mounted wholly or partly below the soil level. Even in such an event the valve will not clog.

Although only one embodiment of the present invention has been disclosed, it is nonetheless to be broadly construed and not to be limited except by the character of the claims appended hereto.

I claim:

1. An irrigation valve comprising a base and a cap, said base including a base wall having an inlet bore substantially centrally thereof and an upstanding flange surrounding said inlet bore, said base wall having a first surface within said upstanding flange, said cap including a cover portion, an outer depending flange and an inner depending flange, the outside diameter of said inner depending flange being substantially equal to the inside diameter of said upstanding flange whereby said cap is frictionally secured to said base, the outermost end of said inner flange being spaced from said first surface to define a first passage communicating with said inlet bore, second passage means defining a second passage between said inner flange and said upstanding flange for communication with said first passage, the outermost end of said upstanding flange adapted for engagement with the inner surface of said cover portion, third passage means defining a third passage between said outermost end of said upstanding flange and said cover portion for communication with said second passage, and said outer depending flange being spaced from the outside surface of said upstanding flange to define a fourth passage communicating between said third passage and the exterior of said valve, said fourth passage defining the outlet of said valve, the outer surface of said inner depending flange having an annular groove adjacent the end of said depending flange.

2. An irrigation valve comprising a base and a cap, said base including a base wall having an inlet bore substantially centrally thereof and an upstanding flange surrounding said inlet bore, said base wall having a first surface within said upstanding flange, said cap including a cover portion, an outer depending flange and an inner depending flange, the outside diameter of said inner depending flange being substantially equal to the inside diameter of said upstanding flange whereby said cap is frictionally secured to said base, the outermost end of said inner flange being spaced from said first surface to define a first passage communicating with said inlet bore, second passage means defining a second passage between said inner flange and said upstanding flange for communication with said first passage, the outermost end of said upstanding flange adapted for engagement with the inner surface of said cover portion, third passage means defining a third passage between said outermost end of said upstanding flange and said cover portion for communication with said second passage, and said outer depending flange being spaced from the outside surface of said upstanding flange to define a fourth passage communicating between said third passage and the exterior of said valve, said fourth passage defining the outlet of said valve, the outer surface of said upstanding flange having an annular groove adjacent the end of said upstanding flange.

3. An irrigation valve comprising a base and a cap, said base including a base wall having an inlet bore substantially centrally thereof and an upstanding flange surrounding said inlet bore, said base wall having a first surface within said upstanding flange, said cap including a cover portion, an outer depending flange and an inner depending flange, the outside diameter of said inner depending flange being substantially equal to the inside diameter of said upstanding flange whereby said cap is frictionally secured to said base, the outer most end of said inner flange being spaced from said first surface to define a first passage communicating with said inlet bore, second passage means defining a second passage between said inner flange and said upstanding flange for communication with said first passage, the outermost end of said upstanding flange adapted for engagement with the inner surface of said cover portion, third passage means defining a third passage between said outermost end of said upstanding flange and said cover portion for communication with said second passage, and said outer depending flange being spaced from the outside surface of said upstanding flange to define a fourth passage communicating between said third passage and the exterior of said valve, said fourth passage defining the outlet of said valve, the total cross-sectional area of said third passage being less than the total cross-sectional area of said first passage, and the distance between the outermost end of said inner flange and said first surface being less than the largest cross-sectional dimension of said third passage-defining means.